(12) United States Patent
Kwon (10) Patent No.: US 11,329,306 B2
(45) Date of Patent: May 10, 2022

(54) CELL STACKING APPARATUS AND MANUFACTURING SYSTEM FOR SECONDARY BATTERY

(71) Applicants: HYUNDAI MOTOR COMPANY, Seoul (KR); KIA MOTORS CORPORATION, Seoul (KR)

(72) Inventor: Se Ho Kwon, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 488 days.

(21) Appl. No.: 16/433,757

(22) Filed: Jun. 6, 2019

(65) Prior Publication Data

US 2020/0185753 A1 Jun. 11, 2020

(30) Foreign Application Priority Data

Dec. 6, 2018 (KR) .......................... 10-2018-0156414

(51) Int. Cl.
*H01M 10/04* (2006.01)
(52) U.S. Cl.
CPC ... *H01M 10/0404* (2013.01); *H01M 10/0459* (2013.01)

(58) Field of Classification Search
CPC ..................... H01M 10/0404; H01M 10/0459
See application file for complete search history.

(56) References Cited

FOREIGN PATENT DOCUMENTS

| KR | 10-2011-0001295 A | | 1/2011 |
|---|---|---|---|
| KR | 20110001295 A | * | 1/2011 |
| KR | 10-1730469 B1 | | 4/2017 |

* cited by examiner

*Primary Examiner* — Basia A Ridley
*Assistant Examiner* — Heng M. Chan
(74) *Attorney, Agent, or Firm* — Morgan, Lewis & Bockius LLP (57) ABSTRACT

The present disclosure relates to a cell stacking apparatus for a second battery and a system for manufacturing a secondary battery. The cell stacking apparatus includes a grip part configured to hold and move an electrode-separator assembly having a plurality of positive electrode plates and a plurality of negative electrode plates, in which each of the plurality of positive electrode plates and each of the plurality of negative electrode plates are respectively bonded to opposing surfaces of a separator, and a stacking part including a stack plate movable in a cell stacking direction. The stacking part is configured to fold and stack the electrode-separator assembly on the stack plate, and to move the stack plate downward to fold the electrode-separator assembly in zigzags when the grip part holds and moves the electrode-separator assembly to the stack plate.

13 Claims, 7 Drawing Sheets

CELL STACKING APPARATUS AND MANUFACTURING SYSTEM FOR SECONDARY BATTERY

CROSS-REFERENCE TO RELATED APPLICATION

This application claims the benefit of priority to Korean Patent Application No. 10-2018-0156414, filed on Dec. 6, 2018 in the Korean Intellectual Property Office, the entire contents of which are incorporated herein by reference.

TECHNICAL FIELD

The present disclosure relates to a cell stacking apparatus for a secondary battery and a system for manufacturing a secondary battery, and more particularly to a cell stacking apparatus and a secondary battery manufacturing system for simplifying a stacking process.

BACKGROUND

In general, in the case of a secondary battery, a method of manufacturing a cell stack by stacking unit cells, each having a negative electrode plate, a positive electrode plate, and a separator according to desired capacity, has been widely used.

A "Z-fold" method is known as a cell stacking method where a separator having negative and positive electrode plates bonded to both sides thereof is folded in zigzags. A cell stack has a form in which the separator is folded in zigzags, and the negative and positive electrode plates are alternately inserted between adjacent separators folded in zigzags.

A conventional cell stacking apparatus of a Z-fold type cuts and supplies a negative electrode plate and a positive electrode plate to a separator, arranges the negative electrode plate and the positive electrode plate on one surface and an opposite surface of the separator, respectively, and then folds the separator to stack the electrodes.

However, the conventional cell stacking apparatus of a Z-fold type performs the stacking process without bonding the electrodes and the separator in advance. Accordingly, a cutting apparatus, a supply apparatus, an alignment apparatus, and a stacking apparatus for positive and negative electrode plates and a separator supply apparatus are required, and therefore the cell stacking apparatus becomes complex. Furthermore, the accuracy of the electrode positions and the product manufacturing speed are lowered.

SUMMARY

The present disclosure has been made to solve the above-mentioned problems occurring in the prior art while advantages achieved by the prior art are maintained intact.

According to aspects of the present disclosure, a cell stacking apparatus and a secondary battery manufacturing system can provide a simple configuration of equipment, a simplified stacking process, and an improved accuracy in folding and stacking unit cells.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a cell stacking apparatus for a secondary battery includes a grip part configured to hold and move an electrode-separator assembly having a plurality of positive electrode plates and a plurality of negative electrode plates, in which each of the plurality of positive electrode plates and each of the plurality of negative electrode plates are respectively bonded to opposing surfaces of a separator, and a stacking part including a stack plate movable in a cell stacking direction. The stacking part is configured to fold and stack the electrode-separator assembly on the stack plate, and further configured to move the stack plate downward to fold the electrode-separator assembly in zigzags when the grip part holds and moves the electrode-separator assembly to the stack plate.

According to another aspect of the present disclosure, a system for manufacturing a secondary battery includes a supply part configured to continuously supply a separator, a negative electrode plate, and a positive electrode plate, an electrode cutting part disposed behind the supply part and configured to cut the negative electrode plate and the positive electrode plate to a predetermined size, an electrode-separator bonding part disposed behind the electrode cutting part and configured to bond the positive electrode plate to one surface of the separator and the negative electrode plate to another surface of the separator opposing the one surface and to apply heat and pressure to form an electrode-separator assembly, a cell stacking apparatus disposed behind the electrode-separator bonding part and configured to fold and stack the electrode-separator assembly in zigzags, and an extraction part configured to extract the stacked electrode-separator assembly from the cell stacking apparatus. The cell stacking apparatus includes a grip part configured to hold and move the electrode-separator assembly and a stacking part including a stack plate movable in a cell stacking direction. The stacking part is configured to fold and stack the electrode-separator assembly on the stack plate, and further configured to move the stack plate downward to fold the electrode-separator assembly in zigzags when the grip part holds and moves the electrode-separator assembly to the stack plate.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

The following embodiments are embodiments appropriate for the understanding of technical features of a cell stacking apparatus for a secondary battery according to aspects of the present disclosure. However, the present disclosure is not limited to the following embodiments, and technical features of the present disclosure are not restricted by the following embodiments. Furthermore, various changes and modifications can be made without departing from the spirit and scope of the present disclosure.

Figure 1:
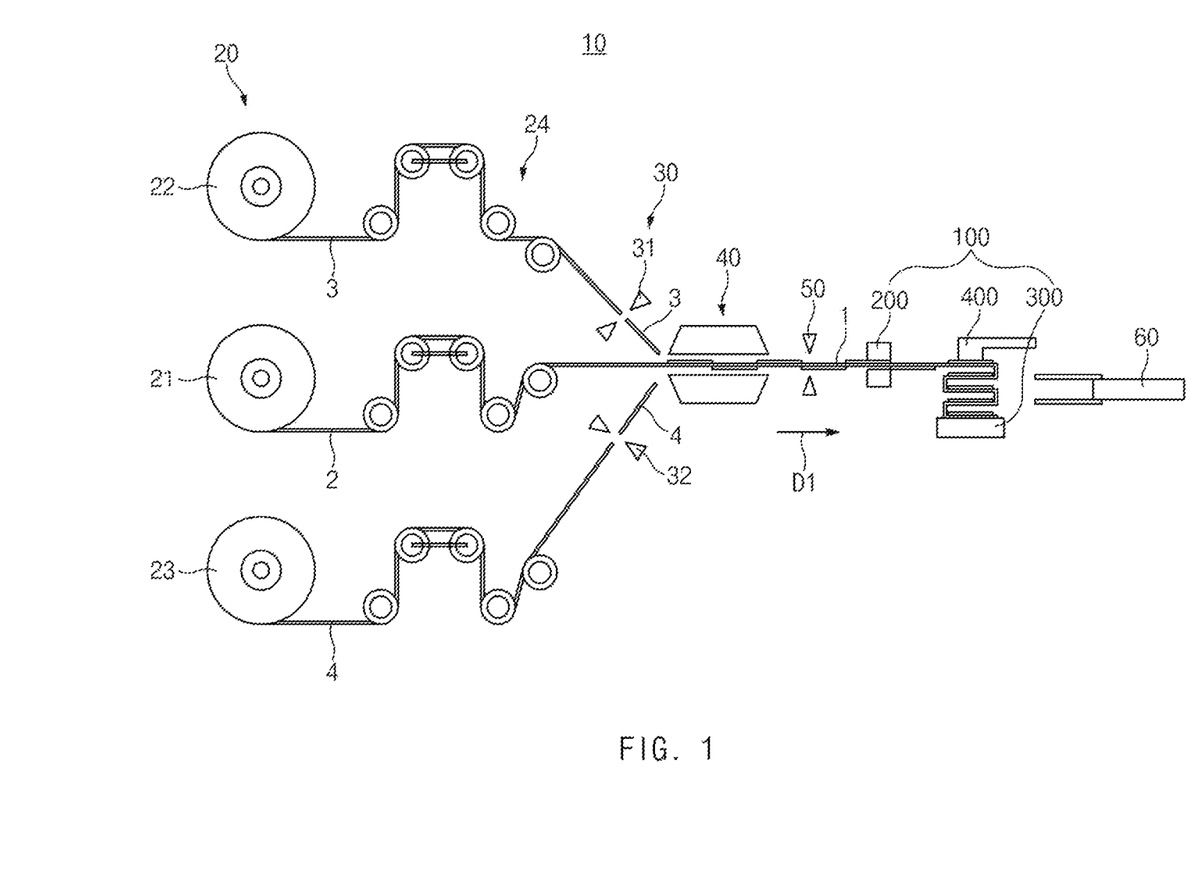
FIG. 1 is a schematic view illustrating a secondary battery manufacturing system according to one aspect of the present disclosure.

Referring to FIG. 1, a secondary battery manufacturing system 10 according to one aspect of the present disclosure may include a supply part 20, an electrode cutting part 30, an electrode-separator bonding part 40, a cell stacking apparatus 100, and an extraction part 60.

The supply part 20 may continuously supply a separator 2, a negative electrode plate 3, and a positive electrode plate 4. For example, the supply part 20 may include a separator reel 21, a negative electrode plate reel 22, and a positive electrode plate reel 23. The separator 2, the negative electrode plate 3, and the positive electrode plate 4 unwound from the respective reels 21, 22, and 23 may be continuously supplied through a web drive part 24.

The electrode cutting part 30 is disposed behind the supply part 20 and cuts the negative electrode plate 3 and the positive electrode plate 4 to a predetermined size. Reference numeral 31 denotes a negative electrode cutting member (e.g., a cutter, etc.) for cutting the negative electrode plate 3, and reference numeral 32 denotes a positive electrode cutting member (e.g., a cutter, etc.) for cutting the positive electrode plate 4.

The electrode-separator bonding part 40 is provided behind the electrode cutting part 30. The electrode-separator bonding part 40 is configured to bond the positive electrode plate 4 to one surface of the separator 2 and the negative electrode plate 3 to an opposite surface of the separator 2 and to apply heat and pressure to form an electrode-separator assembly 1. Specifically, a plurality of negative electrode plates 3 and a plurality of positive electrode plates 4, which are cut to the predetermined size, may be bonded to the one surface and the opposite surface of the continuously supplied separator 2, respectively. Furthermore, a bonding method of applying heat and pressure using a hot rolling roller may be applied to the electrode-separator bonding part 40. However, a bonding method is not limited thereto.

For example, as in the embodiment illustrated, the plurality of positive electrode plates 4 may be bonded to the one surface of the separator 2, but spaced apart from each other to form a separation area therebetween, and the plurality of negative electrode plates 3 may be bonded to the opposite surface of the separator 2, but located to correspond to the separation areas. However, the state in which the negative electrode plates 3 and the positive electrode plates 4 are bonded to the separator 2 is not limited to the embodiment illustrated. For example, the negative electrode plates 3 and the positive electrode plates 4 may be disposed in positions corresponding to the one surface and the opposite surface of the separator 2.

The cell stacking apparatus 100 is provided behind the electrode-separator bonding part 40 and folds and stacks the electrode-separator assembly 1 in zigzags. When the electrode-separator assembly 1 is folded and stacked on a stack plate 310, the separator 2 may be folded in zigzags between which the positive electrode plates 4 and the negative electrode plates 3 are alternately inserted.

A separator cutting part 50 may be provided in front of the cell stacking apparatus 100. The separator cutting part 50 (e.g., a cutter, etc.) may cut the separator 2 according to an electrode stack standard.

The extraction part 60 extracts the stacked electrode-separator assembly 1 from the cell stacking apparatus 100.

Hereinafter, the cell stacking apparatus 100 according to exemplary embodiments of the present disclosure will be described with reference to FIGS. 2 to 7.

Figure 2:
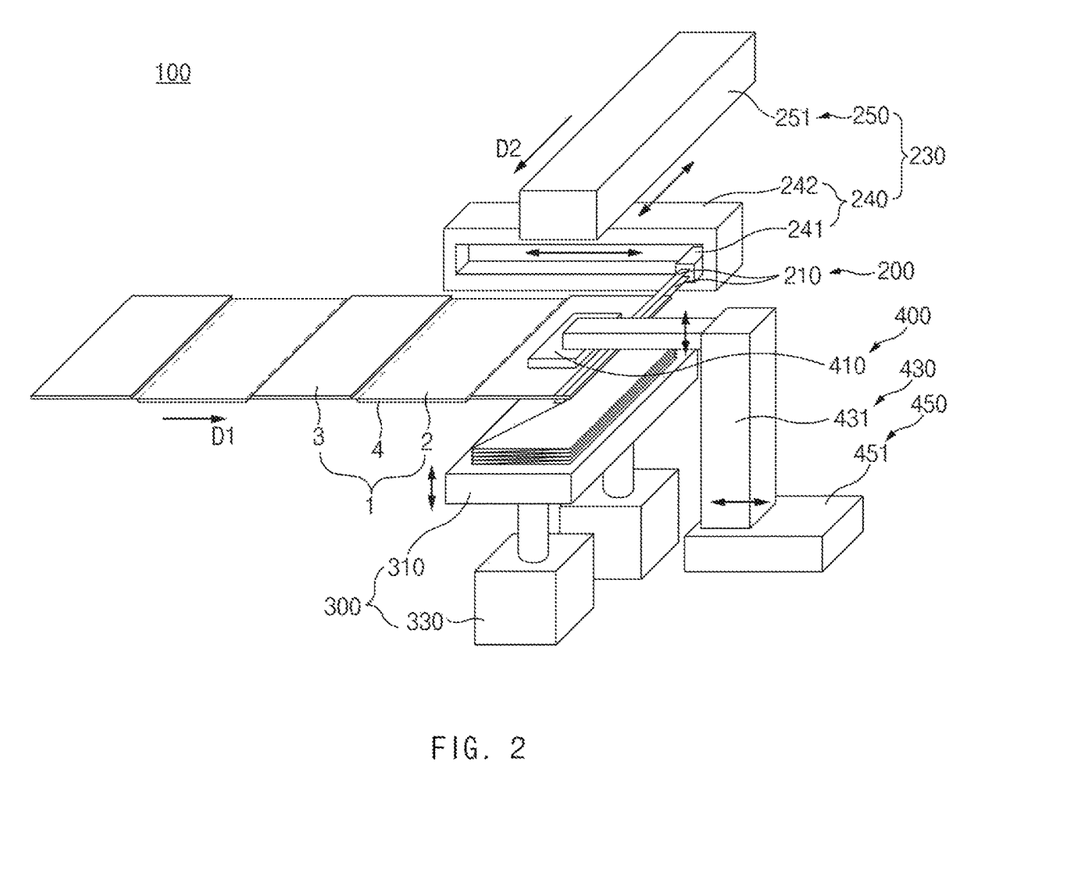
FIG. 2 is a view illustrating a cell stacking apparatus for a secondary battery according to a first exemplary embodiment of the present disclosure.

The cell stacking apparatus 100 according to one aspect of the present disclosure includes a grip part 200 and a stacking part 300.

The grip part 200 holds and moves the electrode-separator assembly 1 having the plurality of positive electrode plates 4 and the plurality of negative electrode plates 3 that are bonded to the one surface and the opposite surface of the separator 2, which extends in a predetermined direction, respectively.

Specifically, the cell stacking apparatus 100 according to one aspect of the present disclosure is based on folding and stacking the electrode-separator assembly 1 having the positive electrode plates 4 and the negative electrode plates 3 bonded to the separator 2. Furthermore, in the case where the electrodes (the positive electrode plates 4 and the negative electrode plates 3) and the separator 2 are bonded by applying pressure/heat using a hot rolling roller when manufacturing the electrode-separator assembly 1 as described above, the accuracy of bonding positions may be secured. Accordingly, the meandering accuracy between the electrodes (the positive electrode plates 4 and the negative electrode plates 3) may be secured when the electrode-separator assembly 1 is folded.

The stacking part 300 may include the stack plate 310 that is movable in the cell stacking direction. Furthermore, the stacking part 300 may fold and stack the electrode-separator assembly 1 on the stack plate 310.

According to one aspect of the present disclosure, when the grip part 200 holds and moves the electrode-separator assembly 1 to the stack plate 310, the stacking part 300 moves the stack plate 310 downward to cause the electrode-separator assembly 1 to be folded in zigzags. The folded electrode-separator assembly 1 may be repeatedly stacked on the stack plate 310 to form one stack cell.

Specifically, in the case where the stack plate 310 moves downward when the grip part 200 holds and moves the electrode-separator assembly 1 to the stack plate 310, the electrode-separator assembly 1 may be bent about distal ends of the positive electrode plates 4 or the negative electrode plates 3 and folded in zigzags.

As described above, the cell stacking apparatus 100 according to one aspect of the present disclosure includes the grip part 200 for moving the electrode-separator assembly 1 and the stack plate 310 that is operated in the cell stacking direction. Accordingly, the cell stacking apparatus 100 may simplify the stacking process. Furthermore, the cell stacking apparatus 100 according to one aspect of the present disclosure forms folding lines while maintaining the bonding structure by using the electrode-separator assembly 1 having the electrode plates 3 and 4 bonded to the separator 2. Accordingly, the cell stacking apparatus 100 may fold and stack the electrode-separator assembly 1 in zigzags by simply moving the stack plate 310 downward when the electrode-separator assembly 1 is moved.

The cell stacking apparatus 100 according to one aspect of the present disclosure may further include a pressing part 400.

In a state in which the electrode-separator assembly 1 is folded in zigzags, the pressing part 400 may press the electrode-separator assembly 1 toward the stack plate 310 to fix the folded state of the electrode-separator assembly 1. By the pressing of the pressing part 400, the electrode-separator assembly 1 folded in zigzags may be fixed, and one layer may be completely stacked.

Specifically, the pressing part 400 may include a pressing plate 410 that presses an upper surface of the electrode-separator assembly 1 stacked on the stack plate 310. Here, the pressing plate 410 may be formed of a plate parallel to the stack plate 310.

When the stack plate 310 moves downward and the electrode-separator assembly 1 is folded, the stacking part 300 may move the stack plate 310 upward again. The pressing part 400 may move the pressing plate 410 to a higher position than the stack plate 310 before the stack plate 310 moves upward, and may press the electrode-separator assembly 1 toward the stack plate 310 when the stack plate 310 moves upward. That is, the electrode-separator assembly 1 may be pressed between the stack plate 310 and the pressing plate 410 when the stack plate 310 moves upward.

The stacking part 300 may further include a stack plate moving part 330. The stack plate moving part 330 (e.g., an actuator, etc.) may be provided below the stack plate 310 and may move the stack plate 310 upward and downward. No special limitation applies to a method of moving the stack plate 310 by the stack plate moving part 330, and various methods may be applied.

Hereinafter, a direction in which the electrode-separator assembly 1 moves is defined as a first direction D1, and a direction perpendicular to the first direction D1 and toward the electrode-separator assembly 1 is defined as a second direction D2. Furthermore, a layer in which the electrode-separator assembly 1 is folded and stacked once is referred to as an p-layer. The layer stacked before the n-layer is referred to as an (n−1) layer, and the layer to be stacked after the n-layer is referred to as an (n+1) layer. Here, n is a natural number of 2 or larger.

The grip part 200 according to a first exemplary embodiment of the present disclosure may include a pair of grippers 210 and a gripper moving part 230.

The pair of grippers 210 may move toward or away from each other. The pair of grippers 210 may be disposed in positions corresponding to opposite surfaces of the electrode-separator assembly 1 when holding the electrode-separator assembly 1 and may extend in a direction parallel to the second direction D2.

Specifically, the electrode-separator assembly 1 may be inserted between the pair of grippers 210. The pair of grippers 210 may hold the electrode-separator assembly 1 while moving toward each other and may release the holding of the electrode-separator assembly 1 while moving away from each other.

The gripper moving part 230 may include a first gripper moving member 240 and a second gripper moving member 250.

The first gripper moving member 240 may include a mounting block 241, a first gripping block 242, and a first gripping actuator (not illustrated).

The pair of grippers 210 may be mounted to the mounting block 241 so as to be movable toward or away from each other. Specifically, the pair of grippers 210 may vertically move toward or away from each other while operating in conjunction with each other.

The mounting block 241 may be mounted in the first gripping block 242 so as to be movable in the first direction D1 or the opposite direction to the first direction D1. The first gripping actuator may provide a driving force to move the mounting block 241. That is, the mounting block 241 may be reciprocally moved in the first direction D1 and the opposite direction thereto by the first gripping actuator.

The second gripper moving member 250 may include a second gripping block 251 and a second gripping actuator (not illustrated).

The first gripping block 242 may be mounted to the second gripping block 251 so as to be movable in the second direction D2 or the opposite direction to the second direction D2. The second gripping actuator may provide a driving force to move the second gripping block 251. That is, the second gripping block 251 may be reciprocally moved in the second direction D2 and the opposite direction thereto by the second gripping actuator. Accordingly, the pair of grippers 210 may move toward or away from the electrode-separator assembly 1. Various drive means such as a drive motor or a cylinder may be applied to the first gripping actuator and the second gripping actuator without any specific limitation.

Figure 3:
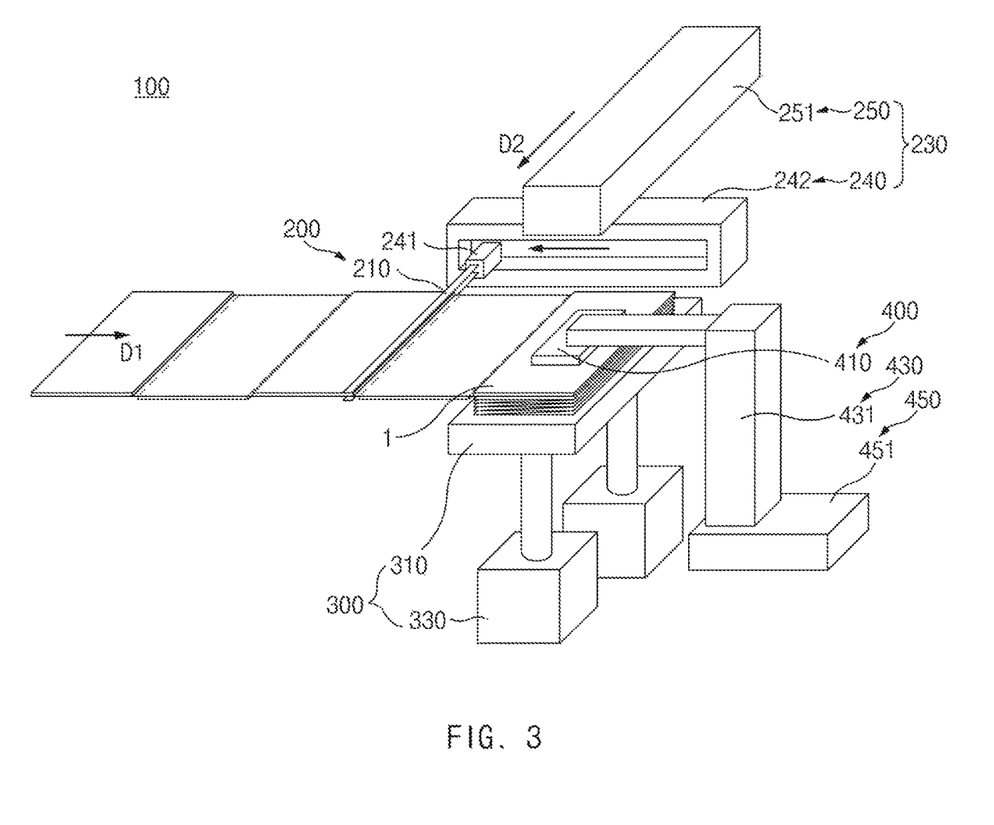
FIG. 3 is a view illustrating a process in which a grip part holds and moves an electrode-separator assembly according to one aspect of the present disclosure.
Figure 4:
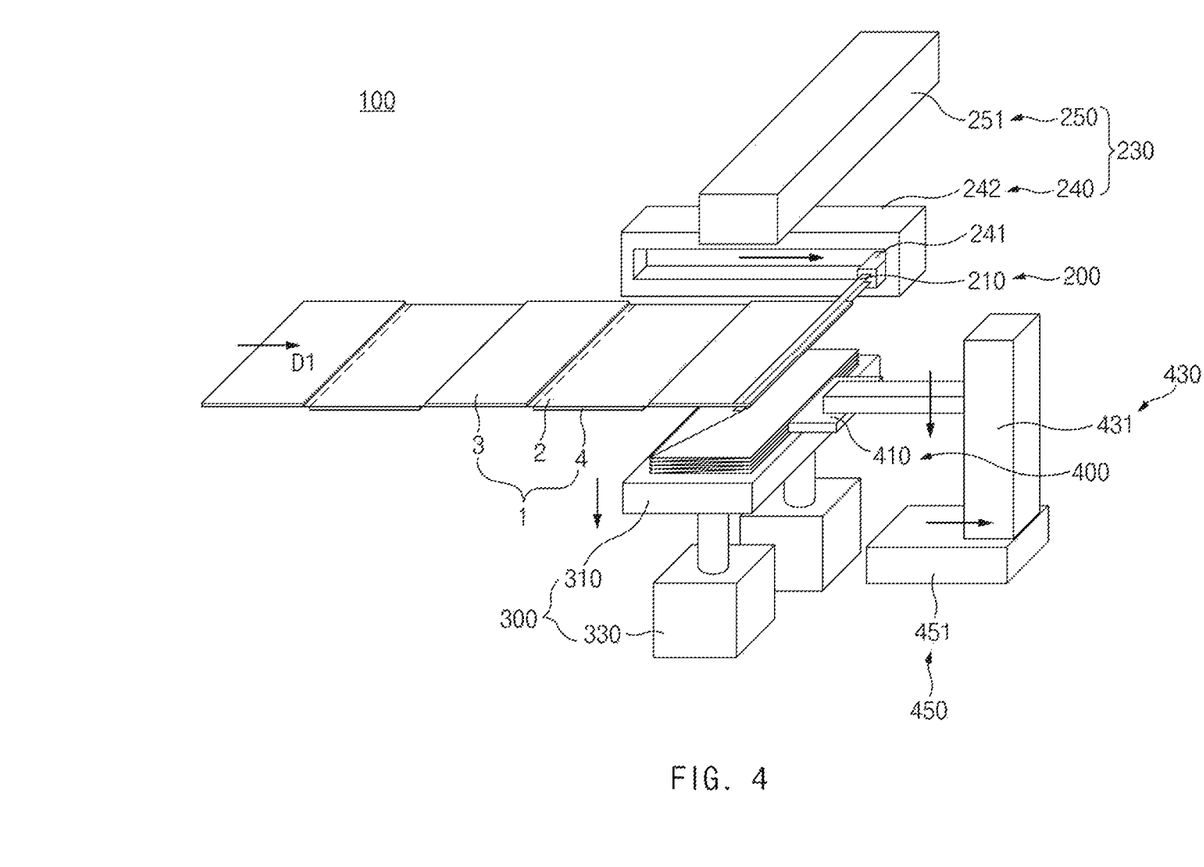
FIG. 4 is a view illustrating a process in which a stack plate moves downward to fold the electrode-separator assembly according to one aspect of the present disclosure.

Referring to FIGS. 3 and 4, when the grippers 210 hold the electrode-separator assembly 1, the first gripper moving member 240 may move the mounting block 241 in the first direction D1. Accordingly, the electrode-separator assembly 1 may be moved to the stacking part 300.

Figure 5:
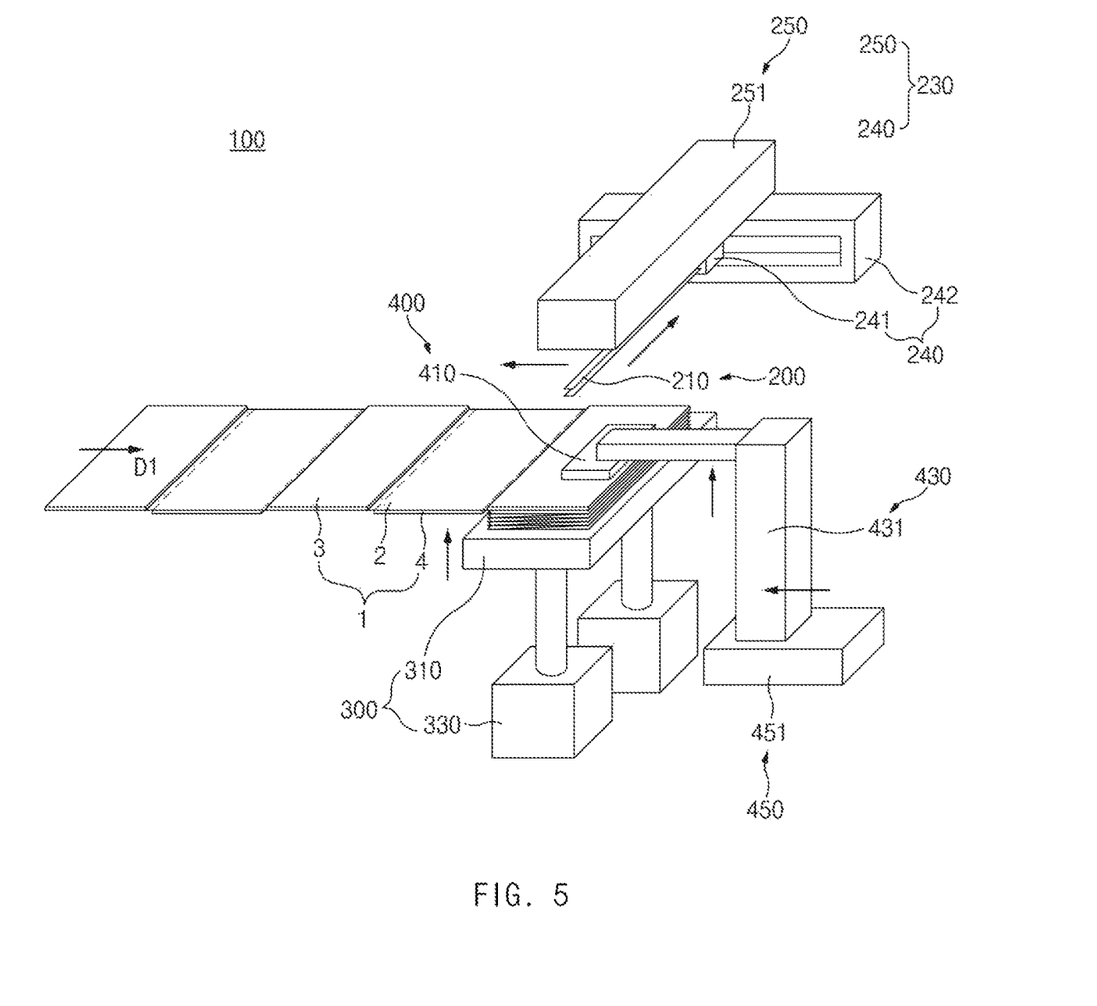
FIG. 5 is a view illustrating a process in which the electrode-separator assembly is pressed by the stack plate and a pressing plate according to one aspect of the present disclosure.

Referring to FIG. 5, when the electrode-separator assembly 1 is pressed between the pressing plate 410 and the stack plate 310 and the n-layer is completely stacked, the pair of grippers 210 may move away from each other to release the holding of the electrode-separator assembly 1.

Then, the second gripper moving member 250 may move the first gripping block 242 in the opposite direction to the second direction D2. As the first gripping block 242 is moved in the opposite direction to the second direction D2, the grippers 210 may move away from the electrode-separator assembly 1.

Thereafter, the first gripper moving member 240 may move the mounting block 241 in the opposite direction to the first direction D1 to cause the grippers 210 to move to the initial position for stack of the (n+1) layer. Specifically, after moving in the opposite direction to the first direction D1 and returning to the initial holding position, the grippers 210 may stand ready for stacking the (n+1) layer.

Referring to FIG. 2, the pressing part 400 may further include a first pressing-plate moving member 430 and a second pressing-plate moving member 450.

The first pressing-plate moving member 430 may include a first pressing-plate block 431, to which the pressing plate 410 is mounted so as to be movable upward and downward, and a first pressing-plate actuator (not illustrated) for providing a driving force to move the pressing plate 410 upward and downward. The first pressing-plate block 431 may have a slot formed thereon for guiding a vertical movement of the pressing plate 410.

The second pressing-plate moving member 450 may include a second pressing-plate block 451, to which the first pressing-plate block 431 is mounted so as to be movable toward or away from the stacking part 300, and a second pressing-plate actuator (not illustrated) for providing a driving force to move the first pressing-plate block 431. The second pressing-plate block 451 may have a slot formed thereon for guiding a horizontal movement of the first pressing-plate block 431.

The first pressing-plate block 431 and the second pressing-plate block 451 are not limited to those described above, and various drive means such as a drive motor may be applied to the first and second pressing-plate actuators.

Referring to FIG. 3, the pressing plate 410 may be located on an upper surface of the electrode-separator assembly 1 stacked in the (n−1) layer before the stack plate 310 moves downward for the stack of the n-layer. Thereafter, the first pressing-plate moving member 430 may move the pressing plate 410 downward in conjunction with the stack plate 310 when the stack plate 310 moves downward for the stack of the n-layer. Accordingly, the pressing plate 410 moves downward together with the stack plate 310 while pressing the electrode-separator assembly 1 stacked in the (n−1) layer.

Referring to FIG. 4, when the stack plate 310 completely moves downward, the second pressing-plate moving member 450 may move the first pressing-plate block 431 to space the pressing plate 410 apart from the electrode-separator assembly 1 stacked in the (n−1) layer. Specifically, after the stack plate 310 moves to the lowermost position, the pressing plate 410 may release the pressing and may move away from the electrode-separator assembly 1.

Referring to FIG. 5, before the stack plate 310 moves upward for the stack of the n-layer, the first pressing-plate moving member 430 may move the pressing plate 410 upward. The second pressing-plate moving member 450 may move the first pressing-plate block 431 to move the pressing plate 410 to a higher position than the electrode-separator assembly 1 to be stacked in the n-layer.

Accordingly, as the stack plate 310 moves upward, the electrode-separator assembly 1 stacked on the stack plate 310 may be pressed by the pressing plate 410.

Figure 6:
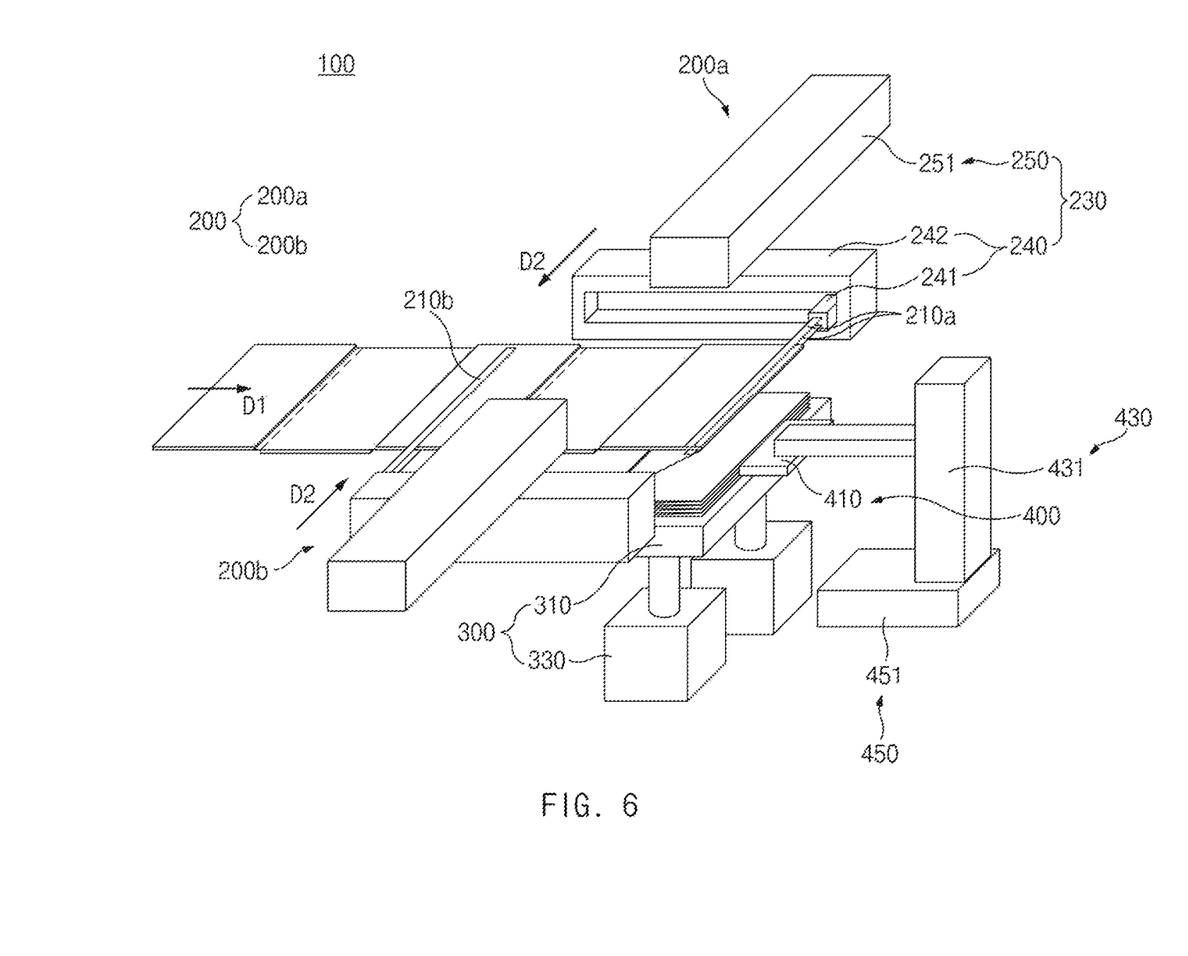
FIG. 6 is a view illustrating a grip part according to a second exemplary embodiment of the present disclosure.
Figure 7:
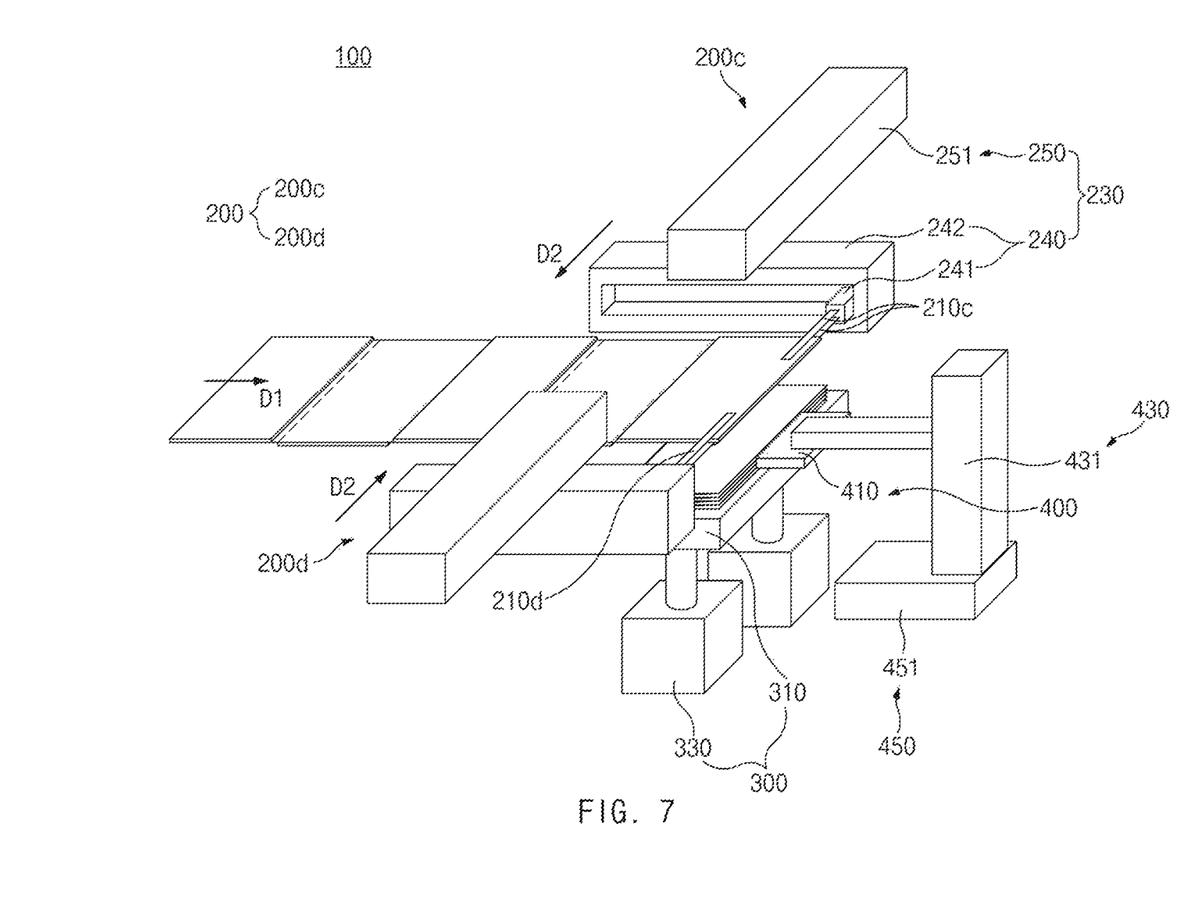
FIG. 7 is a view illustrating a grip part according to a third exemplary embodiment of the present disclosure.

FIG. 6 is a view illustrating a grip part 200 according to a second embodiment of the present disclosure, and FIG. 7 is a view illustrating a grip part 200 according to a third embodiment of the present disclosure.

Referring to FIG. 6, the grip part 200 according to the second embodiment of the present disclosure may include a first grip part 200*a* and a second grip part 200*b* disposed to face the first grip part 200*a* with an electrode-separator assembly 1 disposed therebetween.

Here, a position where the grip part 200 holds the electrode-separator assembly 1 to stack an n-layer on a stack plate 310 may be referred to as a first holding position, and a position where the grip part 200 holds the electrode-separator assembly 1 to stack an (n+1) layer on the stack plate 310 may be referred to as a second holding position. While a pair of first grippers 210*a* of the first grip part 200*a* hold the first holding position, a pair of second grippers 210*b* of the second grip part 200*b* may stand ready for holding the second holding position.

Specifically, the grip part 200 according to the second embodiment of the present disclosure is a dual gripper that includes the first grip part 200*a* and the second grip part 200*b*. The first grip part 200*a* and the second grip part 200*b* may be symmetric to each other with respect to the electrode-separator assembly 1 and may have the same configuration.

When the first grippers 210*a* hold the first holding position and perform a moving and folding process, the second grippers 210*b* may move in the opposite direction to a first direction D1 and may stand ready for holding the second holding position. Accordingly, immediately after the first grippers 210*a* completely perform the folding process, the second grippers 210*b* may perform a moving and folding process.

As described above, the first grip part 200*a* and the second grip part 200*b* may sequentially perform the processes, thereby improving the processing speed. In addition, the first grip part 200*a* and the second grip part 200*b* may consistently assist with the movement of the electrode-separator assembly 1, thereby improving process stability.

Referring to FIG. 7, the grip part 200 according to the third embodiment of the present disclosure may include a third grip part 200*c* and a fourth grip part 200*d* disposed to face the third grip part 200*c* with an electrode-separator assembly 1 disposed therebetween.

A pair of third grippers 210*c* of the third grip part 200*c* and a pair of fourth grippers 210*d* of the fourth grip part 200*d* may extend toward each other, but may be arranged on the same line. The third grippers 210*c* and the fourth grippers 210*d* may simultaneously hold the electrode-separator assembly 1 and may move together.

That is, the grip part 200 according to the third embodiment of the present disclosure is configured in such a manner that the third grippers 210*c* and the fourth grippers 210*d* simultaneously move. Because the third grippers 210*c* and the fourth grippers 210*d* operate at the same time, the third grippers 210*c* and the fourth grippers 210*d* may be longer than the first grippers 210*a* and the second grippers 210*b* to prevent interference between the third grippers 210*c* and the fourth grippers 210*d*.

Because the third and fourth grippers 210*c* and 210*d* operate at the same time, the grip part 200 according to the third embodiment enables a reduction in the stroke of an apparatus for moving the third and fourth grippers 201*c* and 210*d* toward or away from the electrode-separator assembly 1, and therefore the configuration of the cell stacking apparatus 100 may be simplified. Furthermore, the grip part 200 according to the third embodiment may improve the processing speed.

In addition, the grip part 200 according to the third embodiment may improve the accuracy of folding and stacking because the third grippers 210*c* and the fourth grippers 210*d* on the opposite sides simultaneously hold and move the electrode-separator assembly 1.

According to the embodiments of the present disclosure, the cell stacking apparatus forms folding lines while maintaining the bonding structure by using the electrode-separator assembly having the electrode plates bonded to the separator. Accordingly, the cell stacking apparatus may fold and stack the electrode-separator assembly in zigzags by simply moving the stack plate downward when the electrode-separator assembly is moved.

As a result, the present disclosure enables simplification of the cell stacking structure and process and an improvement in the stacking accuracy and the processing speed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cell stacking apparatus for a secondary battery, the apparatus comprising:
   a grip part configured to hold and move an electrode-separator assembly having a plurality of positive electrode plates and a plurality of negative electrode plates, wherein each of the plurality of positive electrode plates and each of the plurality of negative electrode plates are respectively bonded to opposing surfaces of a separator;

a stacking part including a stack plate movable in a cell stacking direction; and a pressing part configured to press the electrode-separator assembly toward the stack plate to fix a folded state of the electrode-separator assembly, with the electrode-separator assembly folded in zigzags, wherein the stacking part is configured to fold and stack the electrode-separator assembly on the stack plate, wherein the stacking part is further configured to move the stack plate downward to fold the electrode-separator assembly in zigzags when the grip part holds and moves the electrode-separator assembly to the stack plate, wherein the pressing part includes a pressing plate configured to press an upper surface of the electrode-separator assembly stacked on the stack plate, and wherein the pressing part further includes:

a first pressing-plate moving member that includes a first pressing-plate block having the pressing plate mounted thereto so as to be movable upward and downward and a first pressing-plate actuator configured to provide a driving force to move the pressing plate upward and downward; and a second pressing-plate moving member that includes a second pressing-plate block having the first pressing-plate block mounted thereto so as to be movable toward or away from the stacking part and a second pressing-plate actuator configured to provide a driving force to move the first pressing-plate block.

2. The apparatus of claim 1, wherein the stacking part is further configured to move the stack plate upward again when the stack plate moves downward to cause the electrode-separator assembly to be folded, and wherein the pressing part is further configured to move the pressing plate to a higher position than the stack plate before the stack plate moves upward, and to press the electrode-separator assembly toward the stack plate when the stack plate moves upward.

3. The apparatus of claim 1, wherein a direction in which the electrode-separator assembly moves is referred to as a first direction, and a direction perpendicular to the first direction and toward the electrode-separator assembly is referred to as a second direction, wherein the grip part includes:

a pair of grippers configured to move toward or away from each other; and a gripper moving part connected to the pair of grippers to reciprocally move the pair of grippers in the first direction and an opposite direction to the first direction or in the second direction and an opposite direction to the second direction, and wherein the pair of grippers are disposed in positions corresponding to opposing surfaces of the electrode-separator assembly when holding the electrode-separator assembly, and extend in a direction parallel to the second direction.

4. The apparatus of claim 3, wherein the gripper moving part includes:

a first gripper moving member that includes a mounting block to which the pair of grippers are mounted so as to be movable toward or away from each other, a first gripping block in which the mounting block is mounted so as to be movable in the first direction or the opposite direction to the first direction, and a first gripping actuator configured to provide a driving force to move the mounting block; and a second gripper moving member that includes a second gripping block to which the first gripping block is mounted so as to be movable in the second direction or the opposite direction to the second direction and a second gripping actuator configured to provide a driving force to move the second gripping block.

5. The apparatus of claim 4, wherein when the electrode-separator assembly is pressed between the pressing plate and the stack plate and an n-layer is completely stacked, the pair of grippers are configured to move away from each other to release holding of the electrode-separator assembly, the second gripper moving member moves the first gripping block in the opposite direction to the second direction, and the first gripper moving member moves the mounting block in the opposite direction to the first direction to cause the pair of grippers to move to an initial position for stack of an (n+1) layer.

6. The apparatus of claim 1, wherein the pressing plate is located on an upper surface of the electrode-separator assembly stacked in an (n−1) layer before the stack plate moves downward for stack of an n-layer, wherein the first pressing-plate moving member is configured to move the pressing plate downward in conjunction with the stack plate when the stack plate moves for the stack of the n-layer, and wherein the second pressing-plate moving member is configured to move the first pressing-plate block to space the pressing plate apart from the electrode-separator assembly stacked in the (n−1) layer, when the stack plate completely moves downward.

7. The apparatus of claim 6, wherein before the stack plate moves upward for the stack of the n-layer, the first pressing-plate moving member is further configured to move the pressing plate upward, and the second pressing-plate moving member is further configured to move the first pressing-plate block for moving the pressing plate to a higher position than the electrode-separator assembly to be stacked in the n-layer.

8. The apparatus of claim 1, wherein the grip part includes a first grip part and a second grip part disposed to face the first grip part with the electrode-separator assembly disposed between the first and second grip parts, wherein a position where the grip part holds the electrode-separator assembly to stack an n-layer on the stack plate is referred to as a first holding position, and a position where the grip part holds the electrode-separator assembly to stack an (n+1) layer on the stack plate is referred to as a second holding position, and wherein a second gripper of the second grip part is configured to stand ready for holding the second holding position, and a first gripper of the first grip part is configured to hold the first holding position.

9. The apparatus of claim 1, wherein the grip part includes a third grip part and a fourth grip part disposed to face the third grip part with the electrode-separator assembly disposed between the third and fourth grip parts, wherein a third gripper of the third grip part and a fourth gripper of the fourth grip part extend toward each other and are arranged on a same line, and wherein the third gripper and the fourth gripper are configured to simultaneously hold the electrode-separator assembly and to move together.

10. The apparatus of claim 1, wherein the stacking part further includes a stack plate moving part disposed below the stack plate and configured to move the stack plate upward and downward.

11. A system for manufacturing a secondary battery, the system comprising:
- a supply part configured to continuously supply a separator, a negative electrode plate, and a positive electrode plate;
- an electrode cutting part disposed behind the supply part and configured to cut the negative electrode plate and the positive electrode plate to a predetermined size;
- an electrode-separator bonding part disposed behind the electrode cutting part and configured to bond the positive electrode plate to one surface of the separator and the negative electrode plate to another surface of the separator opposing the one surface, and to apply heat and pressure to form an electrode-separator assembly;
- a cell stacking apparatus disposed behind the electrode-separator bonding part and configured to fold and stack the electrode-separator assembly in zigzags; and
- an extraction part configured to extract the stacked electrode-separator assembly from the cell stacking apparatus,
- wherein the cell stacking apparatus includes:
- a grip part configured to hold and move the electrode-separator assembly; and
- a stacking part including a stack plate movable in a cell stacking direction,
- wherein the stacking part is further configured to fold and stack the electrode-separator assembly on the stack plate, and
- wherein the stacking part is further configured to move the stack plate downward to fold the electrode-separator assembly in zigzags when the grip part holds and moves the electrode-separator assembly to the stack plate.

12. The system of claim 11, wherein the supply part includes a plurality of reels configured to supply the separator, the negative electrode plate, and the positive electrode plate.

13. A cell stacking apparatus for a secondary battery, the apparatus comprising:
- a grip part configured to hold and move an electrode-separator assembly having a plurality of positive electrode plates and a plurality of negative electrode plates, wherein each of the plurality of positive electrode plates and each of the plurality of negative electrode plates are respectively bonded to opposing surfaces of a separator; and
- a stacking part including a stack plate movable in a cell stacking direction,
- wherein the stacking part is configured to fold and stack the electrode-separator assembly on the stack plate,
- wherein the stacking part is further configured to move the stack plate downward to fold the electrode-separator assembly in zigzags when the grip part holds and moves the electrode-separator assembly to the stack plate,
- wherein the grip part includes a third grip part and a fourth grip part disposed to face the third grip part with the electrode-separator assembly disposed between the third and fourth grip parts,
- wherein a third gripper of the third grip part and a fourth gripper of the fourth grip part extend toward each other and are arranged on a same line, and
- wherein the third gripper and the fourth gripper are configured to simultaneously hold the electrode-separator assembly and to move together.

* * * * *